United States Patent
Ahn et al.

(10) Patent No.: US 9,673,734 B2
(45) Date of Patent: Jun. 6, 2017

(54) APPARATUS FOR DELAY ANGLE COMPENSATION OF FLYING START FUNCTION

(71) Applicant: LSIS CO., LTD., Anyang-si, Gyeonggi-do (KR)

(72) Inventors: Sung Guk Ahn, Seoul (KR); Seung Cheol Choi, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 68 days.

(21) Appl. No.: 14/738,555

(22) Filed: Jun. 12, 2015

(65) Prior Publication Data
US 2015/0365016 A1    Dec. 17, 2015

(30) Foreign Application Priority Data

Jun. 16, 2014  (KR) .................. 10-2014-0072570

(51) Int. Cl.
*H02M 7/537*   (2006.01)
*H02M 7/5375*  (2006.01)
(Continued)

(52) U.S. Cl.
CPC .......... *H02M 7/5375* (2013.01); *H02P 1/029* (2013.01); *H02P 21/06* (2013.01); *H02P 27/06* (2013.01)

(58) Field of Classification Search
CPC .. H02M 7/537; H02M 7/5375; H02M 7/5387; H02M 7/53871; H02P 21/06; H02P 27/06
See application file for complete search history.

(56) References Cited

U.S. PATENT DOCUMENTS

| 4,719,398 A | 1/1988 | Paice |
| 7,078,873 B2 * | 7/2006 | Suzuki .................. H02P 23/14 318/437 |

(Continued)

FOREIGN PATENT DOCUMENTS

| JP | 10-191690 | 7/1998 |
| JP | 2000-295889 | 10/2000 |

(Continued)

OTHER PUBLICATIONS

English Translation of Japan Patent Office Application Serial No. 2015-119931, Office Action dated Apr. 19, 2016.*

(Continued)

*Primary Examiner* — Matthew Nguyen
(74) *Attorney, Agent, or Firm* — Lee, Hong, Degerman, Kang & Waimey

(57) ABSTRACT

An apparatus for delay angle compensation for flying start function in a medium-voltage inverter is disclosed. The apparatus generates generate a phase angle (θ) by converting a three-phase voltage of an inverter output terminal to dq-axis voltages (Vd, Vq), and calculate a compensation phase angle by a predetermined delay time. In addition, the apparatus generates an initial angle for the flying start by aggregating the compensation phase angle with the phase angle (θ). The apparatus may drive a high-voltage motor more stably, because an error between a command voltage phase angle and an actual output voltage phase angle may be reduced, when electric power of the medium voltage inverter is restored after a trip or an instantaneous blackout occurs.

4 Claims, 5 Drawing Sheets

(51) Int. Cl.
      *H02P 27/06*       (2006.01)
      *H02P 1/02*       (2006.01)
      *H02P 21/06*       (2016.01)

(56) References Cited

U.S. PATENT DOCUMENTS

| | | | |
|---|---|---|---|
| 7,760,526 B2 * | 7/2010 | Marroni | H02M 7/53873 |
| | | | 363/95 |
| 2008/0030187 A1 | 2/2008 | Nguyen | |
| 2015/0365029 A1 * | 12/2015 | Yang | H02P 6/182 |
| | | | 318/400.34 |

FOREIGN PATENT DOCUMENTS

| | | |
|---|---|---|
| JP | 2007-135250 | 5/2007 |
| JP | 2009-131130 | 6/2009 |

OTHER PUBLICATIONS

European Patent Office Application Serial No. 15171005.0, Search Report dated Dec. 9, 2015, 5 pages.
Japan Patent Office Application Serial No. 2015-119931, Office Action dated Apr. 19, 2016, 4 pages.

\* cited by examiner

APPARATUS FOR DELAY ANGLE COMPENSATION OF FLYING START FUNCTION

Pursuant to 35 U.S.C. §119(a), this application claims the benefit of earlier filing date and right of priority to Korean Patent Application No. 10-2014-0072570, filed on Jun. 16, 2014, the contents of which are hereby incorporated by reference herein in its entirety

BACKGROUND

Field of the Disclosure

The present disclosure relates to an apparatus for delay angle compensation of flying start function. More particularly, the apparatus according to the present disclosure enables a medium voltage inverter to be restarted using a flying start function especially when electric power of the medium voltage inverter is restored after a trip or an instantaneous blackout occurs.

Discussion of the Related Art

There are various types of medium-voltage inverters used in industrial sites. For example, a multi-level medium-voltage inverter is an inverter having an input power above 600V as an effective value of a voltage between input lines. An output phase voltage of the multi-level medium-voltage inverter has multi-levels. Medium-voltage inverters are used for high-capacity motors having capacity of hundreds of kW~tens of MW. The medium-voltage inverters are used in various fields such as fans, pumps, compressors, tractions, hoists, and conveyors.

Among the multi-level medium-voltage inverters, a cascaded h-bridge inverter is mainly used as the medium-voltage inverter, because the cascaded h-bridge inverter has a module structure to facilitate expansions.

In addition, a unit power cell may be formed variously, such as an h-bridge inverter, a single-phase NPC (Neutral Point Clamped) inverter, a single-phase T-type NPC inverter, etc.

FIG. 1 is an exemplary view illustrating a conventional medium-voltage inverter system (10), which includes a multi-winding phase-shifting transformer (11), a plurality of power cells (12), and a motor (13).

The multi-winding phase-shifting transformer (11) provides an electrical insulation between an electrical power input terminal and a medium-voltage inverter, reduces input terminal harmonics, and provides a three phase input power supply appropriate to each of the power cells (12). The power cells (12) output phase voltages of the motor (13) by being supplied with a power supply from the multi-winding phase-shifting transformer (11). The motor (13) is a high-voltage three-phase motor. An induction motor or a synchronous motor may be used as the motor (13).

FIG. 2 is an exemplary view illustrating a structure of a power cell (12), which includes a three-phase diode rectifier (12-1), a DC (Direct Current)-link capacitor (12-2), and a single phase full bridge inverter (12-3).

The three-phase diode rectifier (12-1) receives an input of three-phase AC (Alternating Current) voltage, rectifies the three-phase AC voltage with a diode, and output as a DC (Direct Current) voltage. The DC-link capacitor (12-2) maintains the DC voltage outputted from the diode rectifier (12-1), and compensates an instantaneous difference in electric power. The single phase full bridge inverter (12-3) synthesizes output voltages from a DC terminal.

Meanwhile, the motor (13) driven by such medium-voltage inverter generally has a high inertia. Thus, a rotor speed of such motor (13) is not reduced greatly even when the inverter cannot operate normally due to causes such as an abnormality in power supply, a blackout, etc. Therefore, when electric power of the medium voltage inverter is restored from abnormality, it takes long time to restart the inverter after waiting until the rotor speed comes to a zero speed.

To avoid such problem described in the above, it is advantageous to restart the medium-voltage inverter by estimating a rotor speed of the motor (13) when the electric power is restored to a normal state. This function is referred to as "Flying Start".

FIG. 3 is an exemplary view illustrating a conventional method to set an initial angle for flying start. The method includes detecting a three-phase voltage from an output terminal of a medium-voltage inverter (input terminal of a motor), calculating a phase angle (32) through a PLL (31: Phase Locked Loop), and using the calculated phase angle (32) as an initial angle for the flying start.

However, in a conventional method, there occurs a problem that a command voltage phase angle of the inverter differs from an actual output voltage phase angle due to a delay caused by a sampling and/or a filtering. The motor may be damaged by an inrush current generated greatly, when the flying start function is started in a state when the command voltage phase angle of the inverter and the actual output voltage phase angle are different from each other.

SUMMARY OF THE DISCLOSURE

One of purposes of the present disclosure is to reduce motor inrush current by compensating an error between a command voltage phase angle of an inverter and an actual output voltage phase angle, when electric power of the medium voltage inverter is restored after a trip or an instantaneous blackout occurs.

In order to achieve the purpose in the above, there is provided an apparatus for delay angle compensation of flying start function in a medium-voltage inverter, the apparatus comprising: a signal processing unit configured, by converting a three-phase voltage of an inverter output terminal to a two-phase stationary reference frame voltage (V$\alpha\beta$), to generate an AC (Alternating Current) signal V' corresponding to a frequency applied by the inverter and an AC signal qV' having a phase angle delayed by 90 degrees to the V', and to generate a reference frequency ($\omega$') for phase angle compensation; a phase generating unit configured to convert the V' and the qV' signals to dq-axis voltages (Vd, Vq) through a rotary coordinate conversion, and to generate a phase angle ($\theta$) using the Vq; and a phase compensating unit configured to calculate a compensation phase angle by multiplying the reference frequency ($\omega$') generated from the signal processing unit by a predetermined delay time, and to generate an initial angle for the flying start by aggregating the compensation phase angle with the phase angle ($\theta$) generated from the phase generating unit.

In some exemplary embodiments of the present disclosure, the signal processing unit may calculate a frequency error (Ef) by multiplying an error between the two-phase stationary reference frame voltage (V$\alpha\beta$) and the V' by the qV', may perform an integral of the frequency error (Ef) by multiplying the frequency error (Ef) by a certain minus (−) value, and may generate the reference frequency ($\omega$') by aggregating an initial frequency ($\omega_c$) with the integral value.

In some exemplary embodiment of the present disclosure, the phase generating unit may perform a proportional-integral of the Vq, may aggregate the proportional-integral value with an initial frequency ($\omega_c$), and may generate the phase angle (θ) by performing an integral of the aggregated value.

According to an exemplary embodiment of the present disclosure, a motor may be controlled by compensating an error between a command voltage phase angle of an inverter and an actual output voltage phase angle, when electric power of the medium voltage inverter is restored after a trip or an instantaneous blackout occurs.

Therefore, a motor inrush current may be reduced when using a flying start function, and thus, the high-voltage motor may be driven more stably.

DETAILED DESCRIPTION

Hereinafter, referring to enclosed figures, an exemplary embodiment of the present disclosure will be described in detail.

Figure 1:
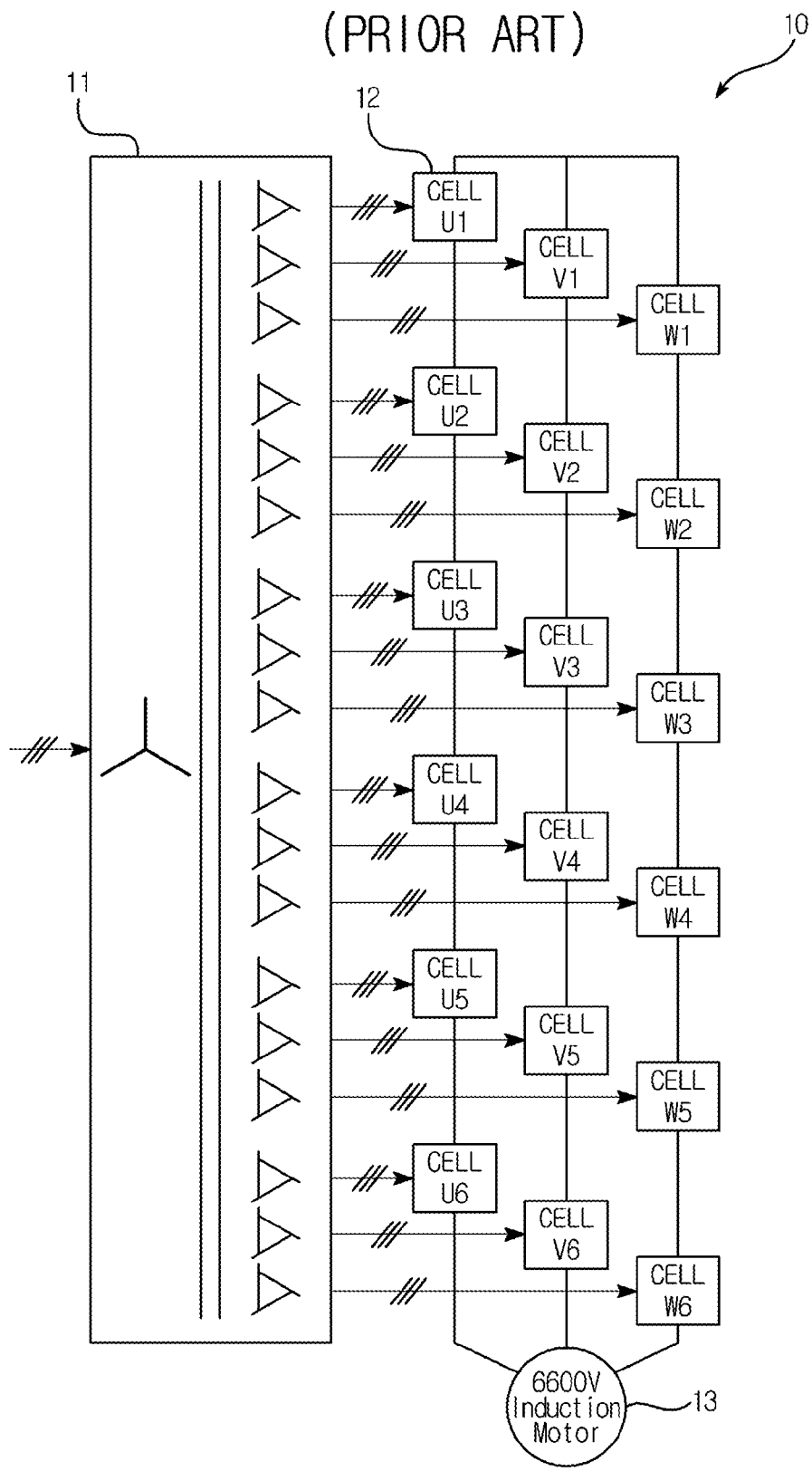
FIG. 1 is an exemplary view illustrating a conventional medium-voltage inverter system.
Figure 2:
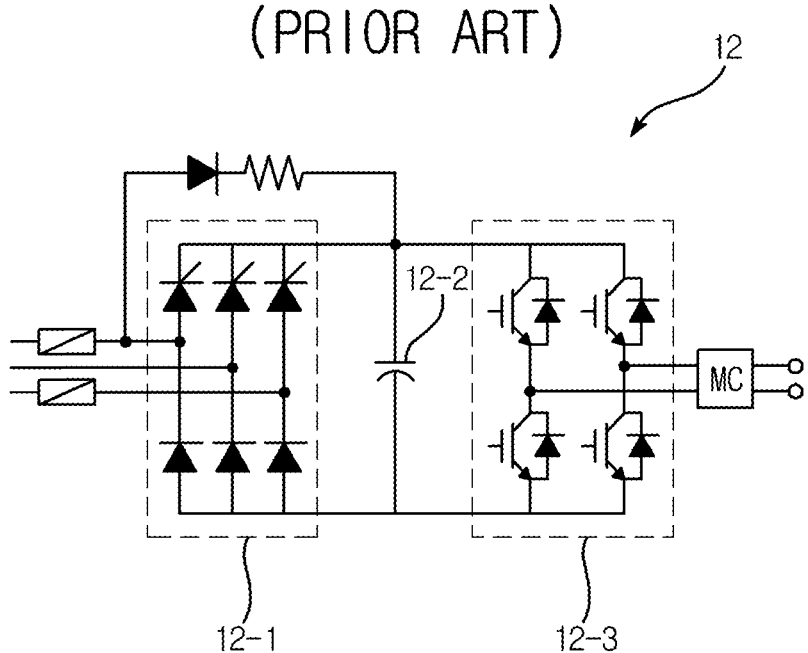
FIG. 2 is an exemplary view illustrating a structure of a power cell.
Figure 3:
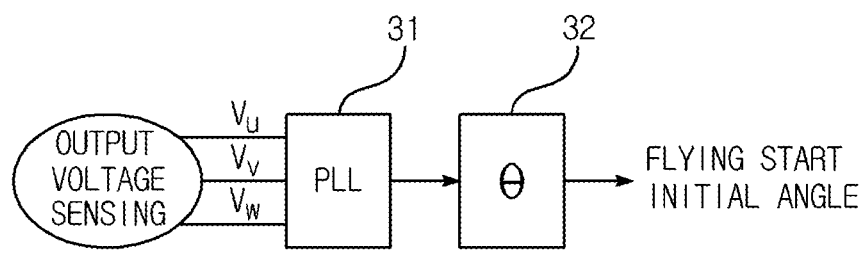
FIG. 3 is an exemplary view illustrating a conventional flying start method.
Figure 4:
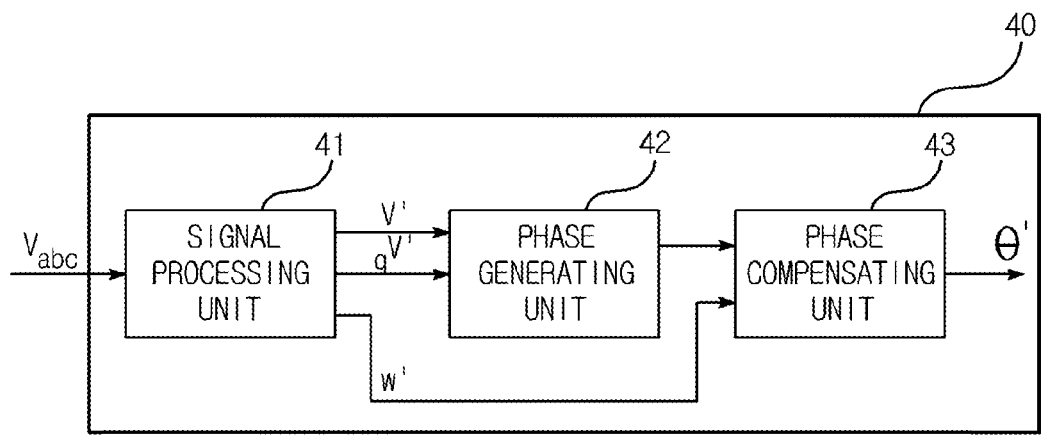
FIG. 4 is a view illustrating an apparatus for delay angle compensation of flying start function according to an exemplary embodiment of the present disclosure.

Referring to FIG. 4, an apparatus (40) for delay angle compensation of flying start function according to an exemplary embodiment of the present disclosure may include a signal processing unit (41), a phase generating unit (42), and a phase compensating unit (43). The apparatus (40) may generate an initial angle for the flying start function through phase angle compensation. The flying start initial angle does not have an error between a command voltage and an output voltage.

Figure 5:
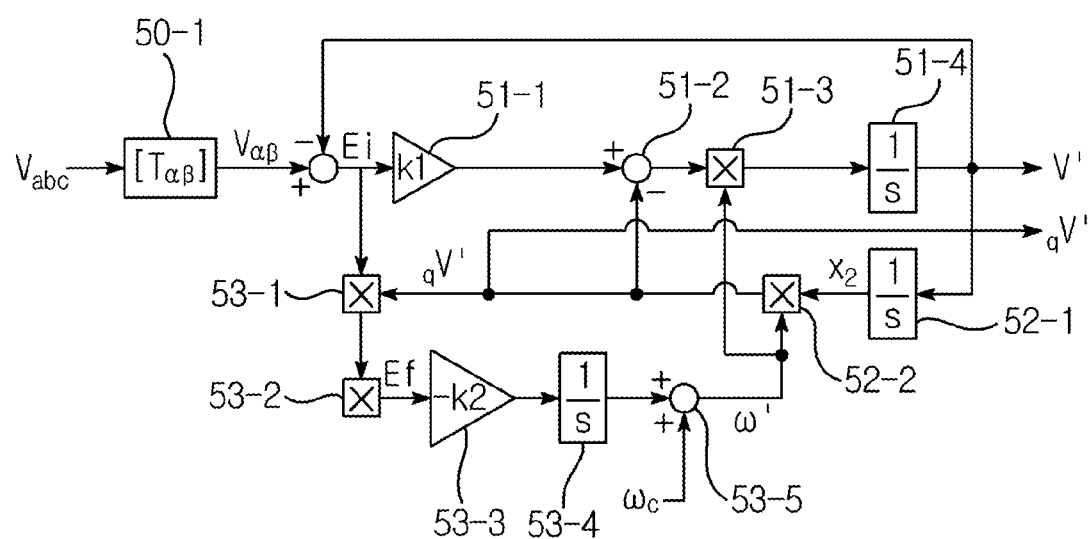
FIG. 5 is a view illustrating a signal processing unit according to an exemplary embodiment of the present disclosure.

FIG. 5 is a view illustrating a signal processing unit (41) according to an exemplary embodiment of the present disclosure. The signal processing unit (41) may be formed by using a SOGI (Second Order Generalized Integrator).

The signal processing unit (41) may receive a voltage (Vabc) from an output terminal of an inverter (input terminal of a motor). The signal processing unit (41) may receive a phase voltage or a line-to-line voltage of an inverter. The signal processing unit (41) may convert the voltage (Vabc) from an output terminal of an inverter to a two-phase stationary reference frame voltage (Vαβ) using a transfer matrix (50-1, Tαβ).

In addition, the signal processing unit (41) may, by using the Vαβ, generate an AC (Alternating Current) signal V' corresponding to a frequency applied by the inverter and an AC signal qV' having a phase angle delayed by 90 degrees to the V', and may generate a reference frequency (ω') for phase angle compensation.

Considering more particularly, the signal processing unit (41) may generate V', by multiplying a gain K1 (51-1) by a difference (Ei) between Vαβ and V', subtracting qV' from the multiplied signal (51-2), multiplying the subtracted value by ω' (51-3), and performing an integral of the multiplied value (51-4).

V' may become qV', by being multiplied by ω'(52-2), after being integrated (52-1).

A transfer function (D(s)) between Vαβ and V' may be expressed by the following equation:

$$D(s) = \frac{V'}{V\alpha\beta}(s) = \frac{k1\omega's}{s^2 + k1\omega's + \omega'^2} \quad \text{[Equation 1]}$$

In addition, a transfer function (Q(s)) between Vαβ and qV' may be expressed by the following equation:

$$Q(s) = \frac{qV'}{V\alpha\beta}(s) = \frac{k1\omega's}{s^2 + k1\omega's + \omega'^2} \quad \text{[Equation 2]}$$

Ef is a frequency error, which is calculated by multiplying Ei by qV' (53-1).

ω' is calculated, by multiplying Ef by a negative (−) value (−K2) (53-2, 53-3), integrating the multiplied value (53-4), and aggregating the integrated value with an initial frequency ($\omega_c$) (53-5).

The phase generating unit (42) may convert V' and qV' signals to dq-axis voltages (Vd, Vq) through a rotary coordinate conversion, and may generate a phase angle (θ) using the q-axis voltage Vq.

Figure 6:
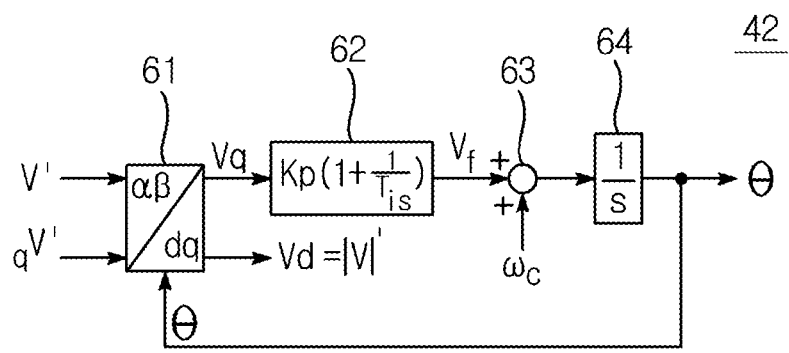
FIG. 6 is a view illustrating a phase generating unit according to an exemplary embodiment of the present disclosure.

FIG. 6 is a view illustrating a phase generating unit (42) according to an exemplary embodiment of the present disclosure. The phase generating unit (42) may be formed by using a PLL (Phase Locked Loop).

A coordinate conversion unit (61) may convert V' and qV' signals generated from the signal processing unit (41) to dq-axis voltages (Vd, Vq), by performing a proportional-integral of V' and qV' signals. Subsequently, the coordinate conversion unit (61) may perform a proportional-integral (62) of the q-axis voltage qV', and may aggregate the proportional-integral value with an initial frequency ($\omega_c$) (63).

The proportional-integral (62) may be performed according to the following Equation 3:

$$Kp\left(1 + \frac{1}{Tiss}\right), \quad \text{[Equation 3]}$$

where Kp is a gain, and Ti is a time constant.

Henceforth, a phase angle (θ) may be generated (64) by performing an integral of the aggregated value of an output (Vf) from the proportional-integral unit (62) and the initial frequency ($\omega_c$). The generated phase angle (θ) may be fed back to the coordinate conversion unit (61) to be used for the coordinate conversion.

Figure 7:
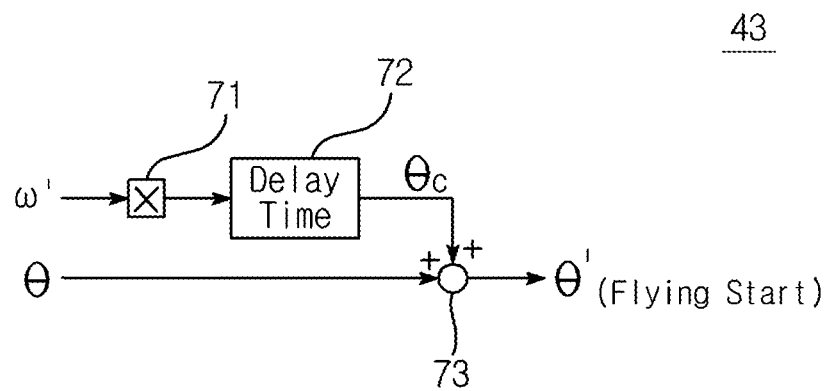
FIG. 7 is a view illustrating a phase compensating unit according to an exemplary embodiment of the present disclosure.

FIG. 7 is a view illustrating a phase compensating unit (43) according to an exemplary embodiment of the present disclosure. A compensation phase angle (θc) may be calculated by multiplying ω' generated from the signal processing unit (41) by a predetermined delay time (71, 72). An initial angle (θ') for flying start may be generated by aggregating the calculated compensation phase angle (θc) with the phase angle (θ) generated from the phase generating unit (42).

At this moment, the delay occurs by a time constant of a filter or a sampling time of the system. The delay time may be predetermined in consideration of such delay factors.

An error caused by the delay time may be reduced in the initial angle (θ') generated from the phase compensating unit (43). Thus, a fast and precise flying start may be performed, and a motor inrush current may be reduced, because an output voltage equal to a phase of a command voltage may be applied.

Figure 8:
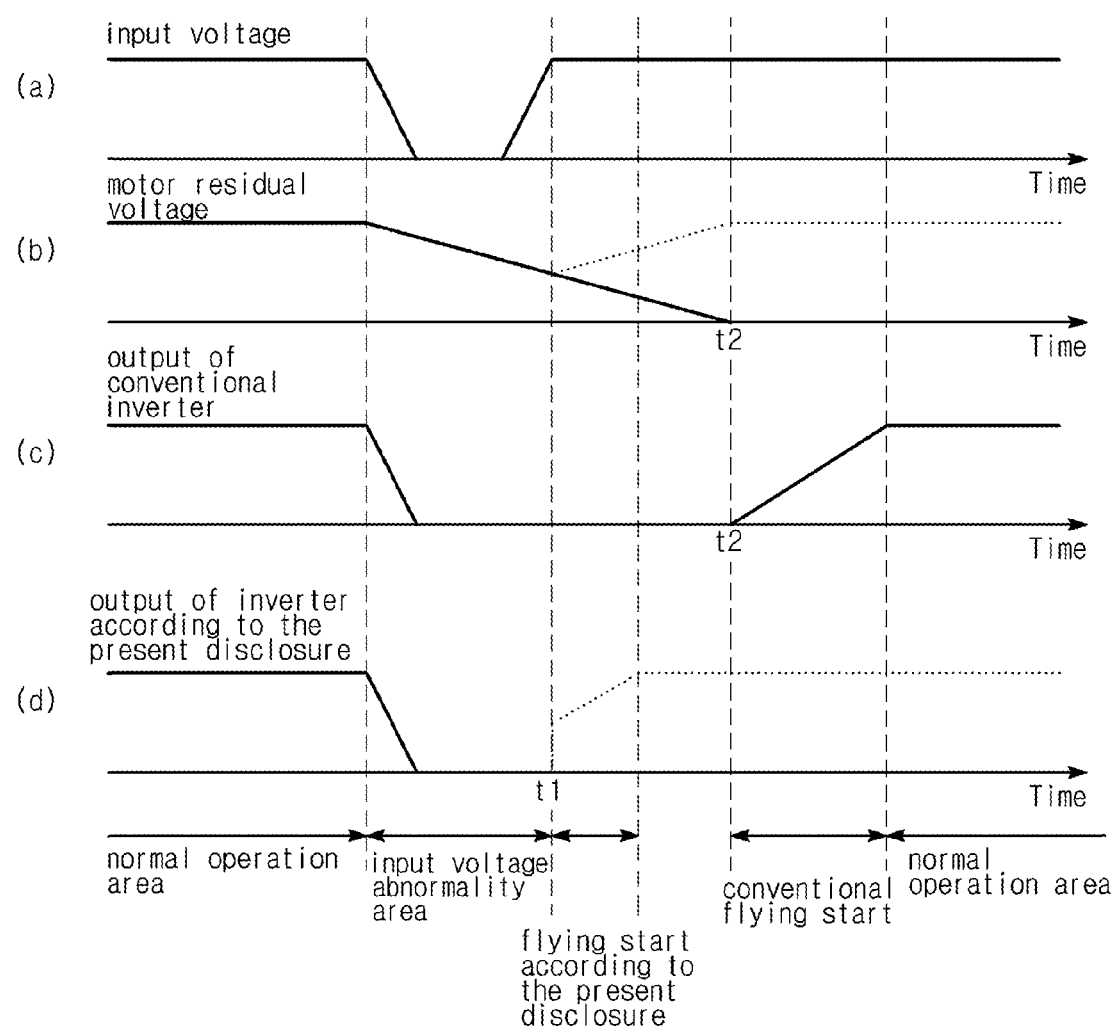
FIG. 8 is an exemplary view illustrating a starting point using a flying start initial angle.

FIG. 8 is an exemplary view illustrating a starting point using a flying start initial angle. A motor residual voltage and outputs of inverters are compared to each other, when an electric power of each inverter is inputted as illustrated in FIG. 8a.

When an abnormality occurs in the input power supply, a motor runs in a state of free run due to inertia, and an output of an inverter is shut off, because no voltage is applied to the motor.

As illustrated in FIG. 8b, while running in a free run state, the residual voltage (counter electromotive force) of the motor may be generated for about 10 seconds in general (although may be different by types of motors).

Conventionally, the flying start operation is started after waiting until the time point (t2) when the residual voltage of the motor becomes extinct, as illustrated in FIG. 8c.

However, when using the apparatus (40) for delay angle compensation of flying start function according to an exemplary embodiment of the present disclosure, the flying start operation can be driven even at the time point (t1) while the residual voltage of the motor still remains, as illustrated in FIG. 8d.

The exemplary embodiments described in the above are proposed in order to facilitate understanding of the present disclosure. Thus, the present disclosure is not limited by the exemplary embodiments described in the above. Therefore, it will be apparent that the persons who skilled in the art of the present disclosure may easily perform various transformed or modified embodiments within the limit of the claimed technical spirit of the present disclosure.

What is claimed is:

1. An apparatus for delay angle compensation for a flying start function in a medium-voltage inverter, the apparatus comprising:

a signal processing unit configured, by converting a three-phase voltage of an inverter output terminal to a two-phase stationary reference frame voltage (Vαβ), to generate an AC signal (V') corresponding to a frequency applied by the inverter and an AC signal (qV') having a phase angle delayed by 90 degrees to V' and to generate a reference frequency (ω') for phase angle compensation;

a phase generating unit configured to convert V' and qV' to dq-axis voltages (Vd, Vq) through a rotary coordinate conversion and to generate a phase angle (θ) using Vq; and a phase compensating unit configured to calculate a compensation phase angle by multiplying ω' by a predetermined delay time and to generate an initial angle for the flying start function by aggregating the compensation phase angle with θ.

2. The apparatus of claim 1, wherein the signal processing unit is further configured to:

calculate a frequency error (Ef) by multiplying an error between Vαβ and V' by qV';

perform an integral of Ef multiplied by a certain minus value; and generate ω' by aggregating an initial frequency ($\omega_c$) with the integral value.

3. The apparatus of claim 1, wherein the phase generating unit is further configured to:

perform a proportional-integral of Vq;

aggregate the proportional-integral value with an initial frequency ($\omega_c$); and generate θ by performing an integral of the aggregated value.

4. The apparatus of claim 1, wherein the signal processing unit is formed by using a SOGI (Second Order Generalized Integrator) and is further configured to generate V' and qV' according to the following transfer functions:

$$D(s) = \frac{V'}{V\alpha\beta}(s) = \frac{k1\omega's}{s^2 + k1\omega's + \omega'^2}; \text{ and}$$

$$Q(s) = \frac{qV'}{V\alpha\beta}(s) = \frac{k1\omega's}{s^2 + k1\omega's + \omega'^2}$$

wherein k1 is a gain multiplied by a difference between Vαβ and V'.

* * * * *